United States Patent
Cheng et al.

(10) Patent No.: US 10,609,363 B2
(45) Date of Patent: Mar. 31, 2020

(54) METHOD AND SYSTEM FOR DISPLAY DEVICE WITH INTEGRATED POLARIZER

(71) Applicant: Magic Leap, Inc., Plantation, FL (US)

(72) Inventors: Hui-Chuan Cheng, Cooper City, FL (US); Ivan Li Chuen Yeoh, Fort Lauderdale, FL (US); Lionel Ernest Edwin, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 46 days.

(21) Appl. No.: 15/897,001

(22) Filed: Feb. 14, 2018

(65) Prior Publication Data

US 2018/0234675 A1  Aug. 16, 2018

Related U.S. Application Data

(60) Provisional application No. 62/459,984, filed on Feb. 16, 2017.

(51) Int. Cl.
| | |
|---|---|
| *G02B 27/28* | (2006.01) |
| *H04N 13/332* | (2018.01) |
| *H01Q 15/24* | (2006.01) |
| *H04N 9/31* | (2006.01) |
| *G02F 1/1335* | (2006.01) |
| *G02B 27/01* | (2006.01) |
| *G02B 5/30* | (2006.01) |

(52) U.S. Cl.
CPC ....... *H04N 13/332* (2018.05); *G02B 27/0172* (2013.01); *G02F 1/133528* (2013.01); *H01Q 15/24* (2013.01); *H04N 9/3167* (2013.01); *G02B 5/3058* (2013.01); *G02B 27/28* (2013.01); *G02B 2027/012* (2013.01); *G02B 2027/0125* (2013.01); *G02F 2001/133548* (2013.01)

(58) Field of Classification Search
CPC .......... G02B 27/0172; G02B 2027/012; G02B 2027/0125; G02B 27/28; G02B 5/3058; G02F 1/133528; G02F 2001/133548; H01Q 15/24; H04N 13/332; H04N 9/3167
See application file for complete search history.

(56) References Cited

U.S. PATENT DOCUMENTS

| | | | |
|---|---|---|---|
| 5,499,053 | A | 3/1996 | Itoh |
| 5,579,161 | A | 11/1996 | Sekiguchi |
| 6,088,067 | A | 7/2000 | Willett et al. |
| 2002/0057498 | A1 | 5/2002 | Kobayashi et al. |
| 2004/0099972 | A1 | 5/2004 | Morris et al. |
| 2004/0105617 | A1 | 6/2004 | Cornelissen et al. |

(Continued)

OTHER PUBLICATIONS

PCT/US2018/018222, "International Search Report and Written Opinion", dated Apr. 27, 2018, 12 pages.

*Primary Examiner* — William R Alexander
*Assistant Examiner* — Balram T Parbadia
(74) *Attorney, Agent, or Firm* — Kilpatrick Townsend & Stockton LLP

(57) ABSTRACT

An eyepiece unit for projecting an image to an eye of a viewer includes an eyepiece having a world side and a viewer side opposite the world side. The eyepiece unit also includes a polarizer disposed adjacent the world side of the eyepiece. In an example, the polarizer comprises a wire grid polarizer. In some embodiments, the wire grid polarizer is operable to transmit p-polarized light and reflect s-polarized light. In some embodiments, the polarizer can include an absorptive polarizer.

24 Claims, 7 Drawing Sheets

(56) References Cited

U.S. PATENT DOCUMENTS

| | | |
|---|---|---|
| 2006/0274272 A1 | 12/2006 | Yoshihide et al. |
| 2007/0070508 A1 | 3/2007 | Ruhle et al. |
| 2008/0012998 A1 | 1/2008 | Arai |
| 2010/0149073 A1* | 6/2010 | Chaum ............... G02B 27/0093 345/8 |
| 2012/0044431 A1 | 2/2012 | Osterman et al. |
| 2012/0062998 A1* | 3/2012 | Schultz ............ B29D 11/00663 359/630 |
| 2012/0212400 A1 | 8/2012 | Border et al. |
| 2013/0070338 A1 | 3/2013 | Gupta et al. |
| 2013/0113973 A1* | 5/2013 | Miao ....................... G09G 3/003 348/333.01 |
| 2014/0092461 A1* | 4/2014 | Spitzer ..................... G02B 5/30 359/241 |
| 2014/0104665 A1* | 4/2014 | Popovich ............. G02B 6/0076 359/15 |
| 2014/0146379 A1* | 5/2014 | Sakai ....................... G02C 7/12 359/241 |
| 2014/0240843 A1* | 8/2014 | Kollin ................ G02B 27/0172 359/633 |
| 2015/0160529 A1* | 6/2015 | Popovich ................ G02F 1/292 359/200.8 |
| 2015/0378074 A1 | 12/2015 | Kollin et al. |
| 2016/0077338 A1* | 3/2016 | Robbins ............. G02B 27/0172 345/8 |
| 2016/0209703 A1 | 7/2016 | Kim et al. |
| 2017/0010488 A1 | 1/2017 | Klug et al. |
| 2017/0139210 A1* | 5/2017 | Vallius ................. G02B 5/1842 |
| 2017/0176745 A1* | 6/2017 | Poon ................. G02B 27/0172 |
| 2017/0212348 A1* | 7/2017 | Fu ............................ G02B 1/11 |
| 2017/0235142 A1* | 8/2017 | Wall .................. G02B 27/0172 359/633 |
| 2017/0242258 A1* | 8/2017 | Edwards .............. G02B 5/3016 |

\* cited by examiner

METHOD AND SYSTEM FOR DISPLAY DEVICE WITH INTEGRATED POLARIZER

CROSS-REFERENCES TO RELATED APPLICATIONS

This application claims priority to U.S. Provisional Patent Application No. 62/459,984, filed on Feb. 16, 2017, entitled "Method and System for Display Device with Integrated Polarizer," the disclosure of which is hereby incorporated by reference in its entirety for all purposes.

BACKGROUND OF THE INVENTION

Modern computing and display technologies have facilitated the development of systems for so called "virtual reality" ("VR") or "augmented reality" ("AR") experiences, wherein digitally reproduced images or portions thereof are presented to a viewer in a manner wherein they seem to be, or may be perceived as, real. A VR scenario typically involves presentation of digital or virtual image information without transparency to other actual real-world visual input; an AR scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present disclosure relates generally to methods and systems related to projection display systems including wearable displays. More particularly, embodiments of the present disclosure provide methods and systems for eyepiece units with one or more integrated polarizers and improved system performance. The disclosure is applicable to a variety of applications in computer vision and image display systems.

In some projection display systems, light from a projector can be coupled into an eyepiece, which, in turn, projects images to a viewer's eye. In addition light from the projector that is intended for the viewer's eye, light originating from sources other than the projector, for example, light from overhead lights near the viewer, may be coupled into the eyepiece, thereby creating artifacts that are presented to the viewer.

According to embodiments of the present disclosure, optical elements, for example, a polarizer, a waveplate, and/or a cosmetic lens, which may be curved, are integrated with an eyepiece. The integration of these optical elements with the eyepiece can result in low levels of artifact production as polarization control is utilized to decrease the coupling efficiency of light from sources other than the projector.

According to an embodiment of the present disclosure, an eyepiece unit for projecting an image to an eye of a viewer is provided. The eyepiece unit includes an eyepiece having a world side and a viewer side opposite the world side and a polarizer disposed adjacent the world side of the eyepiece. In an example, the polarizer comprises a wire grid polarizer. In some embodiments, the wire grid polarizer is operable to transmit p-polarized light and reflect s-polarized light. In some embodiments, the polarizer can include an absorptive polarizer.

According to another embodiment of the present disclosure, an eyepiece unit for projecting an image to an eye of a viewer includes an eyepiece having a world side and a viewer side opposite the world side, a curved cosmetic lens disposed adjacent the world side of the eyepiece, and a polarizer disposed between the eyepiece and the curved cosmetic lens.

According to another embodiment of the present disclosure, an eyepiece unit for projecting an image to an eye of a viewer includes an eyepiece having a world side and a viewer side opposite the world side, a curved cosmetic lens disposed adjacent the world side of the eyepiece, and a polarizer disposed between the eyepiece and the curved cosmetic lens.

According to yet another embodiment of the present disclosure, an eyepiece unit for projecting an image to an eye of a viewer includes an eyepiece having a world side and a viewer side opposite the world side, a curved cosmetic lens disposed adjacent the world side of the eyepiece, a polarizer disposed between the eyepiece and the curved cosmetic lens, and a quarter waveplate disposed between the eyepiece and the polarizer. In an embodiment, the polarizer comprises a wire grid polarizer. In an embodiment, the eyepiece unit can also include a dichroic polarizer positioned between wire grid polarizer and the quarter waveplate.

Numerous benefits are achieved by way of the present disclosure over conventional techniques. For example, embodiments of the present disclosure provide methods and systems that reduce undesirable artifacts that can adversely impact viewer experience. Additionally, some embodiments recycle world light, light emitted by the eyepiece, or both. Dynamic attenuation functionality is provided by some embodiments, for example, in combination with recycling of light emitted by the eyepiece. These and other embodiments of the disclosure along with many of its advantages and features are described in more detail in conjunction with the text below and attached figures.

BRIEF DESCRIPTION OF THE DRAWINGS

The teachings of the embodiments disclosed herein can be readily understood by considering the following detailed description in conjunction with the accompanying drawings.

Figure (FIG.) 1 illustrates schematically the light paths in a viewing optics assembly (VOA) that may be used to present a digital or virtual image to a viewer, according to some embodiments.

DETAILED DESCRIPTION OF THE PREFERRED EMBODIMENTS

The Figures (FIGS.) and the following description relate to various embodiments by way of illustration only. It should be noted that from the following discussion, alternative embodiments of structures and methods disclosed herein will be readily recognized as viable alternatives that can be employed without departing from the principles discussed herein. Reference will now be made in detail to several embodiments, examples of which are illustrated in the accompanying figures.

The present disclosure relates generally to methods and systems related to projection display systems including wearable displays. More particularly, embodiments of the present disclosure provide methods and systems for eyepiece units with one or more integrated polarizers and improved system performance. The disclosure is applicable to a variety of applications in computer vision and image display systems.

Figure 1:
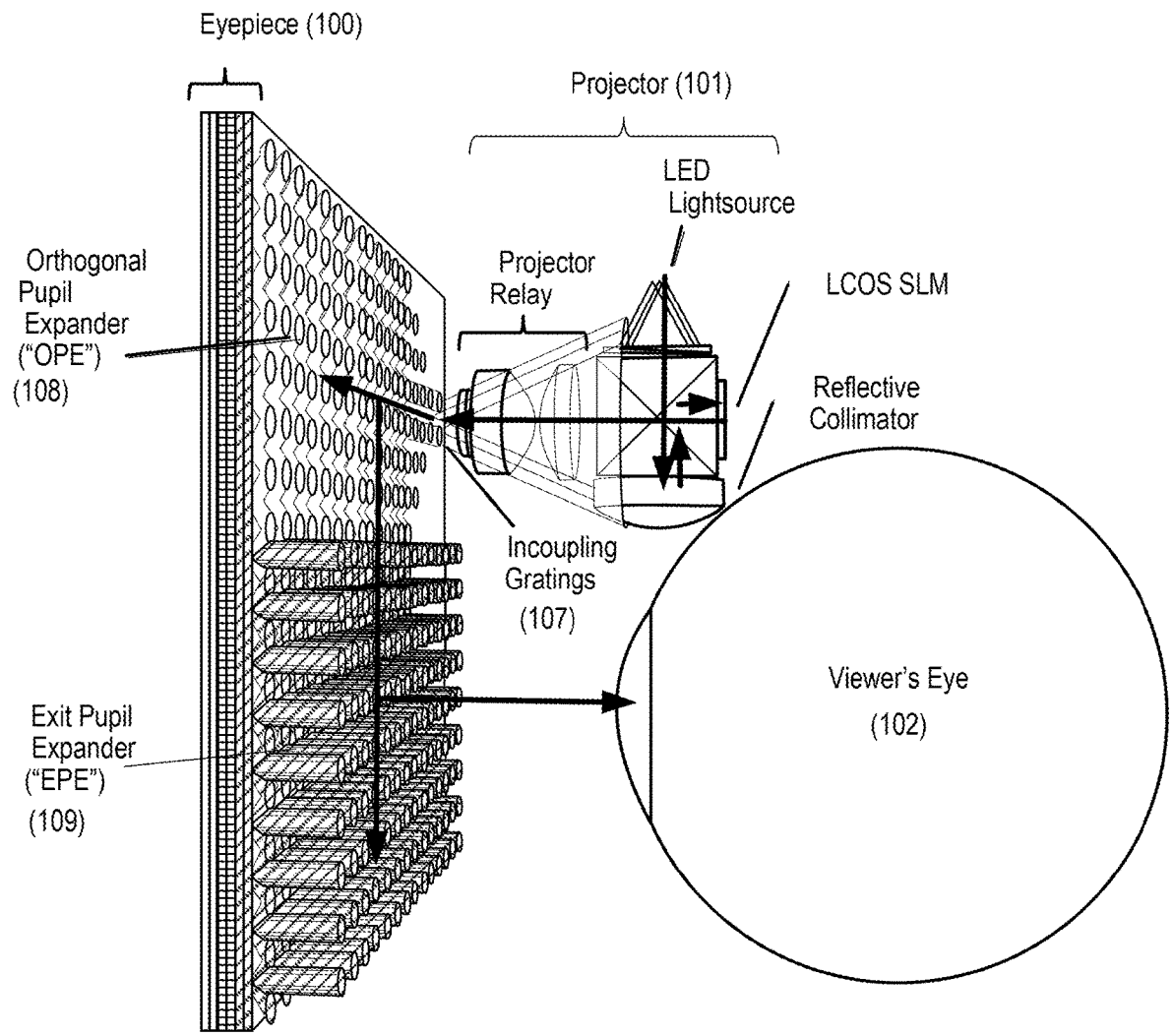

FIG. 1 illustrates schematically light paths in a viewing optics assembly (VOA) that may be used to present a digital or virtual image to a viewer, according to some embodiments. The VOA includes a projector 101 and an eyepiece 100 that may be worn around a viewer's eye 102. In some embodiments, the projector 101 may include a group of red LEDs, a group of green LEDs, and a group of blue LEDs. For example, the projector 101 may include two red LEDs, two green LEDs, and two blue LEDs, according to some embodiments. The eyepiece 100 may include one or more eyepiece layers. In some embodiments, the eyepiece 100 includes three eyepiece layers, one eyepiece layer for each of the three colors, red, green, and blue. In some embodiments, the eyepiece 100 may include six eyepiece layers, one set of eyepiece layers for each of the three colors configured for forming a virtual image at one depth plane, and another set of eyepiece layers for each of the three colors configured for forming a virtual image at another depth plane. In some embodiments, the eyepiece 100 may include three or more eyepiece layers for each of the three colors for three or more different depth planes. Each eyepiece layer includes a planar waveguide and may include an incoupling grating 107, an orthogonal pupil expander (OPE) region 108, and an exit pupil expander (EPE) region 109.

The projector 101 projects image light onto the incoupling grating 107 in an eyepiece layer of the eyepiece 100. The incoupling grating 107 couples the image light from the projector 101 into the planar waveguide propagating in a direction toward the OPE region 108. The planar waveguide propagates the image light in the horizontal direction by total internal reflection (TIR). The OPE region 108 of the eyepiece layer also includes a diffractive element that couples and redirects a portion of the image light propagating in the planar waveguide toward the EPE region 109. The EPE region 109 includes a diffractive element that couples and directs a portion of the image light propagating in the planar waveguide in a direction approximately perpendicular to the plane of the eyepiece layer toward the viewer's eye 102. In this fashion, an image projected by the projector 101 may be viewed by the viewer's eye 102.

As described above, image light generated by the projector 101 may include light in the three primary colors, namely blue (B), green (G), and red (R). Such image light can be separated into the constituent colors, so that image light in each constituent color may be coupled to a respective waveguide in the eyepiece 100.

Figure 2:
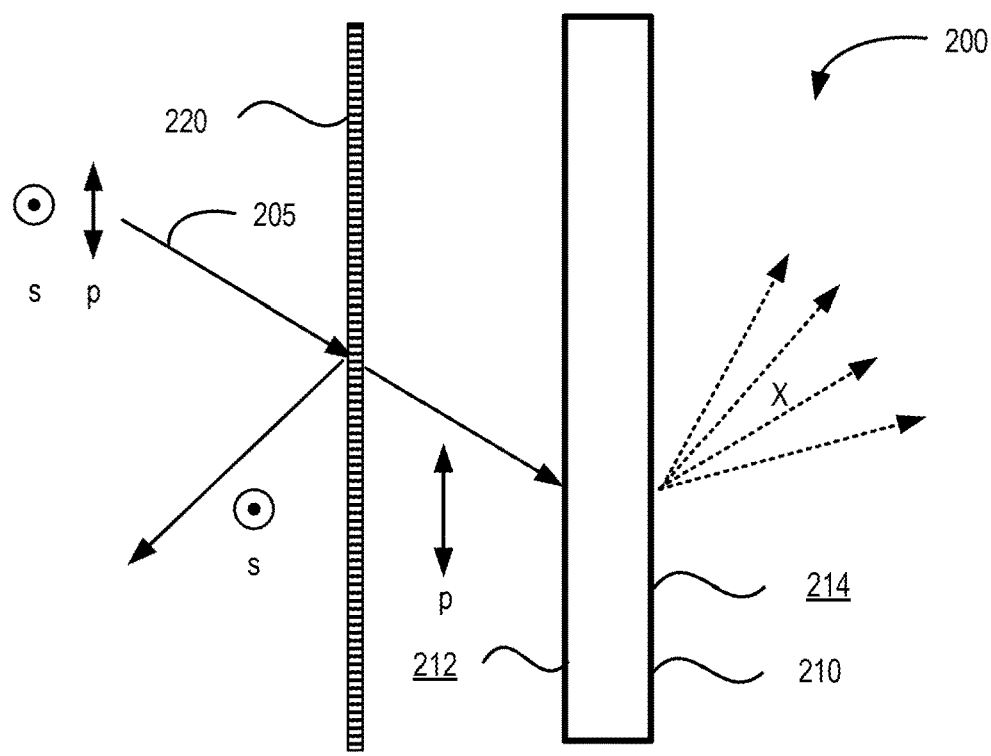
FIG. 2 is a side view illustrating a polarizer integrated with an eyepiece, according to some embodiments.

FIG. 2 is a side view illustrating a polarizer integrated with an eyepiece, according to some embodiments. FIG. 2 illustrates an eyepiece unit 200 including an eyepiece 210 and a polarizer 220. The eyepiece unit 200 projects images to a viewer's eye. The eyepiece 210 includes a world side 212 and a viewer side 214 opposite the world side 212. In some embodiments, the polarizer 220 may be a wire grid polarizer, and in some embodiments, the polarizer 220 may be an absorptive polarizer, such as, for example, a dichroic polarizer.

Incoming light from a scene, which can be referred to as a world light, and is represented by world light ray 205, includes both s-polarized light and p-polarized light. Artifacts can be produced when high angle light, that is, light incident on an eyepiece unit 200 at a large angle of incidence, for example, from overhead lights, is coupled into the eyepiece unit 200, for example, by diffraction through an EPE toward the a viewer's eye 102.

In the embodiment illustrated in FIG. 2, the polarizer 220 is a wire grid polarizer and is oriented to transmit light having a first polarization (e.g., p-polarized light) and reflect light having a second polarization orthogonal to the first polarization (e.g., s-polarized light). As illustrated in FIG. 2, the p-polarized light of the world light ray 205 impinges on an eyepiece 210 and cannot efficiently be coupled into the eyepiece 210 through diffractive optical elements present in the eyepiece 210. The polarizer 220 may be a wire grid polarizer. If a wire grid polarizer is utilized, the transmission axis of the wire grid polarizer can be aligned or oriented such that the wire grid polarizer can transmit p-polarized light and reflect s-polarized light.

The polarizer 220 may be a dichroic polarizer. If a dichroic polarizer is utilized, then rather than reflecting the s-polarized light strongly as illustrated in FIG. 2, the s-polarized light would be substantially absorbed by the dichroic polarizer.

According to embodiments of the present disclosure, the eyepiece 210 design is such that diffractive structures in the eyepiece 210 diffract light in a polarization sensitive manner. As a result, the coupling of light at high angles of incidence into the eyepiece 210, for example, by diffraction through the EPE, is stronger for one polarization than the other, for example, a polarization sensitivity of ~1:3 at the design wavelength of interest. Accordingly, in some designs, s-polarized light is coupled into the eyepiece 210 more efficiently than p-polarized light (e.g., at a ratio of 3:1), which can result in a 75% reduction in artifact intensity. The present disclosure is not limited to this polarization sensitivity and other polarization sensitivities are included within the scope of the present disclosure. For example, a diffractive optical element with a multistep grating design can be utilized to increase the polarization sensitivity to 1:20, resulting in an artifact intensity reduction of 95% at the design wavelength and significant reduction (e.g., ~83% reduction) for other wavelengths. Thus, as illustrated in FIG. 2, high angle light having the s-polarization is blocked by the polarizer 220 and the light having p-polarization is poorly coupled into the eyepiece 210, resulting in a reduction in rainbow artifacts.

Although FIG. 2 illustrates the polarizer 220 implemented as a wire grid polarizer, this is not required by the present disclosure and absorptive polarizers can also be utilized in embodiments of the present disclosure. One of ordinary skill in the art would recognize many variations, modifications, and alternatives.

In embodiments, the eyepiece 210 is characterized by a polarization sensitivity for light at angles of incidence greater than a reference angle. This reference angle can vary depending on the configuration. For example, in some embodiment, the reference angle is 37 degrees. This polarization sensitivity can result in a ratio of a coupling efficiency for s-polarized light to a coupling efficiency for p-polarized light of greater than one. As illustrated in FIG. 2, since the polarizer 220 reflects or absorbs s-polarized light, the p-polarized light incident on the eyepiece 210 is not strongly coupled into the eyepiece 210, thereby reducing or eliminating diffraction of the incident light toward the viewer, represented by the dotted rays of diminished amplitude to the right of the viewer side 214 of the eyepiece 210. As illustrated in FIG. 1, the eyepiece 100 can include an input coupling diffractive optical element (e.g., an input coupling grating), an orthogonal pupil expander diffractive optical element (e.g., an orthogonal pupil expander grating), and an exit pupil expander diffractive optical element (e.g., an exit pupil expander grating) and the polarization sensitivity can be associated with the exit pupil expander (e.g., grating). Depending on the design of the eyepiece 100/210, the ratio can be greater than 3:1, greater than 20:1, or the like.

As will be evident to one of skill in the art, the polarization states illustrated in FIG. 2 could be switched as appropriate to the eyepiece 210 and the polarization sensitivity of the particular eyepiece 210. If the coupling efficiency of s-polarized light at high angles of incidence was low in comparison to the coupling efficiency of p-polarized light, s-polarized light could be transmitted and p-polarized light could be reflected and/or absorbed. One of ordinary skill in the art would recognize many variations, modifications, and alternatives.

Figure 3:
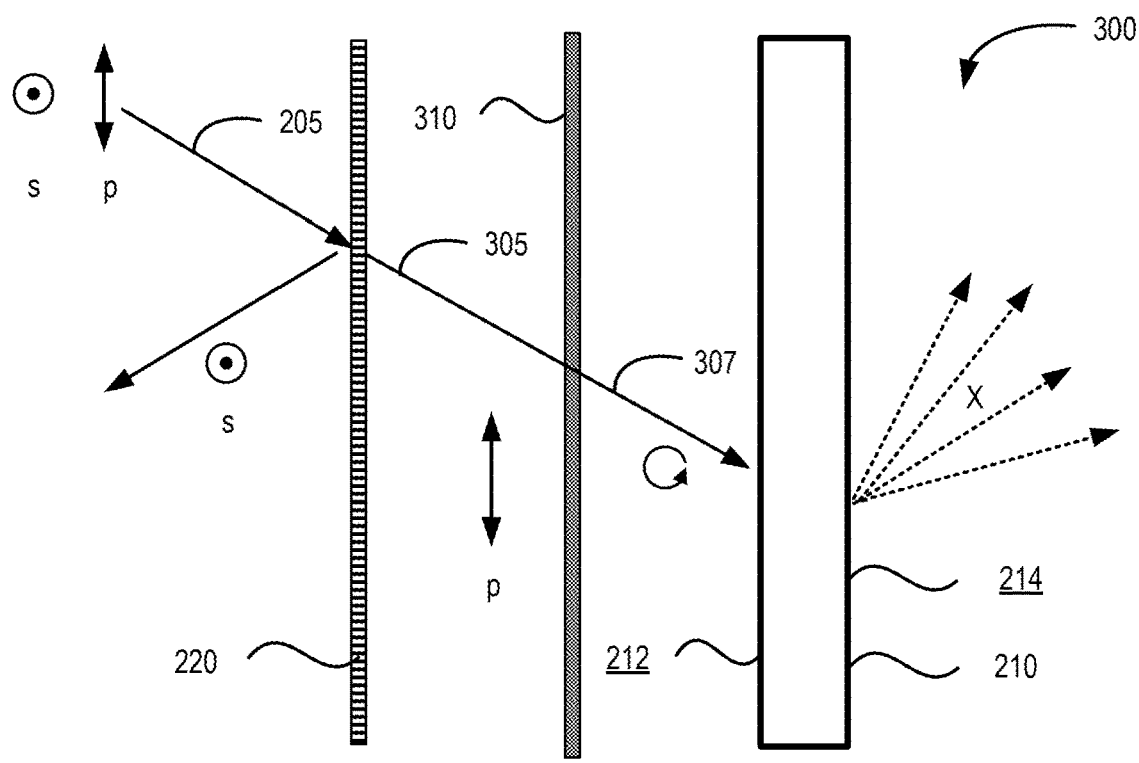
FIG. 3 is a side view illustrating a polarizer and a waveplate integrated with an eyepiece, according to some embodiments.

FIG. 3 is a side view illustrating a polarizer and a waveplate integrated with an eyepiece, according to some embodiments. In implementations in which an eyepiece is characterized by low coupling efficiency for other polarization states, the integration of a waveplate disposed at the appropriate angle, can be utilized to produce low levels of artifacts generated toward the viewer. An eyepiece unit 300 includes a waveplate 310 disposed between the eyepiece 210 and the polarizer 220. In the illustrated embodiment, the waveplate 310 is a quarter waveplate at a visible wavelength at angles of incidence greater than 37 degrees, resulting in conversion of p-polarized light illustrated by ray 305 into circularly polarized light illustrated by ray 307. The low coupling efficiency of circularly polarized light into the eyepiece 210 results in low levels of artifact generation. Thus, according to some embodiments of the present disclosure, polarization states with high coupling efficiency are reflected or absorbed, leaving only polarization states with low coupling efficiency impinging on the eyepiece 210, thereby reducing unwanted artifacts. One of ordinary skill in the art would recognize many variations, modifications, and alternatives.

Figure 4:
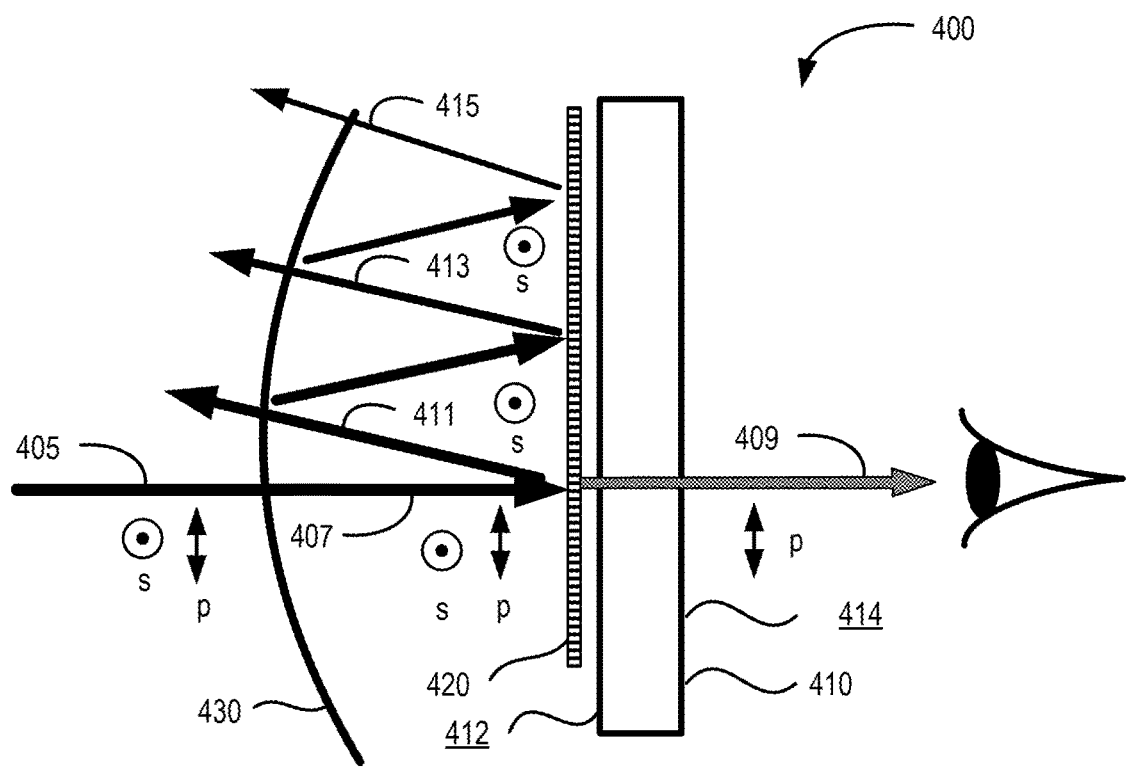
FIG. 4 is a side view illustrating a polarizer integrated with an eyepiece and a curved lens, according to some embodiments.

Although not illustrated in FIGS. 2 and 3, some embodiments of the present disclosure utilize a cosmetic lens such as that illustrated in FIG. 4. A polarizer can be disposed between the cosmetic lens and an eyepiece and can be curved as discussed more fully herein.

In some implementations, an effect referred to as "world ghosts" can be formed when incoming light from the scene, which can be referred to as world light, passes through a curved cosmetic lens, reflects off of the eyepiece at normal incidence, and is reflected off of an inside surface of the curved cosmetic lens at an angle with respect to the normal. Since these reflected rays are traveling an angle with respect to the incoming light from the scene, ghost images can be formed, adversely impacting the viewer experience. The ghost images may have different magnifications. As discussed in relation to FIG. 8 below, coating of the inside surface of the curved cosmetic lens with a reflective coating can improve viewer privacy by reflecting light projected from the eyepiece toward the world, but can also result in reflection toward the eyepiece, producing ghost images.

FIG. 4 is a side view illustrating a polarizer integrated with an eyepiece and a curved lens, according to some embodiments. FIG. 4 illustrates an eyepiece unit 400 including an eyepiece 410, a polarizer 420, and a curved cosmetic lens 430. The eyepiece unit 400 projects images to a viewer's eyes. The eyepiece unit 400 reduces the level of world ghosts and improves viewer experience. The eyepiece 410 has a world side 412 and a viewer side 414 opposite the world side 412. The eyepiece 410 can be coated on either the world side 412 or the viewer side 414 with an antireflection (AR) coating to reduce reflections from these surfaces. The polarizer 420 is disposed adjacent the world side 412 of the eyepiece 410. In some embodiments, the polarizer 220 may be a wire grid polarizer, and in some embodiments, the polarizer 220 may be an absorptive polarizer, such as, for example, a dichroic polarizer. The curved cosmetic lens 430 is disposed adjacent the polarizer 420 such that the polarizer 420 is between the eyepiece 410 and the curved cosmetic lens 430. The curved cosmetic lens 430 may have optical power and function as a prescription lens for the viewer. In other embodiments, the curved cosmetic lens 430 may not have optical power, in which case, it serves only a cosmetic function.

Incoming light from a scene, which can be referred to as a world light, and is represented by world light ray 405, includes both s-polarized light and p-polarized light. The eyepiece 410, the curved cosmetic lens 430, and the polarizer 420 can be positioned along an optical axis parallel to world light ray 405 and the polarizer 420 can be oriented orthogonal to the optical axis. Light in world light ray 405 passes through the curved cosmetic lens 430 and propagates toward the polarizer 420. The portion of the world light (i.e., world light ray 405) that passes through the curved cosmetic lens 430 is represented by ray 407. The ray 407 impinges on the polarizer 420.

In the embodiment illustrated in FIG. 4, the polarizer 420 is a wire grid polarizer and is oriented to transmit p-polarized light and reflect s-polarized light. Accordingly, the p-polarized light passes through the polarizer 420 and impinges on the eyepiece 410, and is transmitted as ray 409 to be viewed by the viewer.

As the ray 407 impinges on the polarizer 420, the light in the s-polarization state is reflected as reflected ray 411 back toward the curved cosmetic lens 430. Although the reflected ray 411 would be normal to the plane of the eyepiece 410, it is illustrated as angled for purposes of clarity. After reflection off of the inside surface (i.e., right surface) of the curved cosmetic lens 430, some of the s-polarized light is reflected back toward the polarizer 420 and the eyepiece 410 at a non-zero angle with respect to the normal since the curved cosmetic lens 430 is curved. As discussed above, this light reflected at non-zero angles will result in images (referred to as ghost images) with a differing magnification from the images formed from world light at normal incidence. As illustrated by ray 413 and 415, the s-polarized light will make multiple reflections between the polarizer 420 and the curved cosmetic lens 430, decreasing in amplitude as a portion of the light will be reflected by the curved cosmetic lens 430 toward the viewer and a portion of the light will pass through the curved cosmetic lens 430 toward the world. Accordingly, embodiments of the present disclosure reduce the magnitude of world ghosts by reflecting one polarization using the polarizer 420 and reducing the amount of light reflected off of the inside surface of the curved cosmetic lens 430 at non-zero angles of incidence that could reach the viewer.

Although a wire grid polarizer reflecting s-polarized light is illustrated in FIG. 4, a dichroic polarizer could be utilized according to embodiments of the present disclosure. In this case, rather than reflecting the s-polarized light strongly as illustrated in FIG. 4, the s-polarized light would be substantially absorbed by the dichroic polarizer. As will be evident to one of skill in the art, the polarization states illustrated in FIG. 4 could be switched as appropriate to the particular application, with s-polarized light being transmitted and p-polarized light being reflected and/or absorbed. One of ordinary skill in the art would recognize many variations, modifications, and alternatives.

Figure 5:
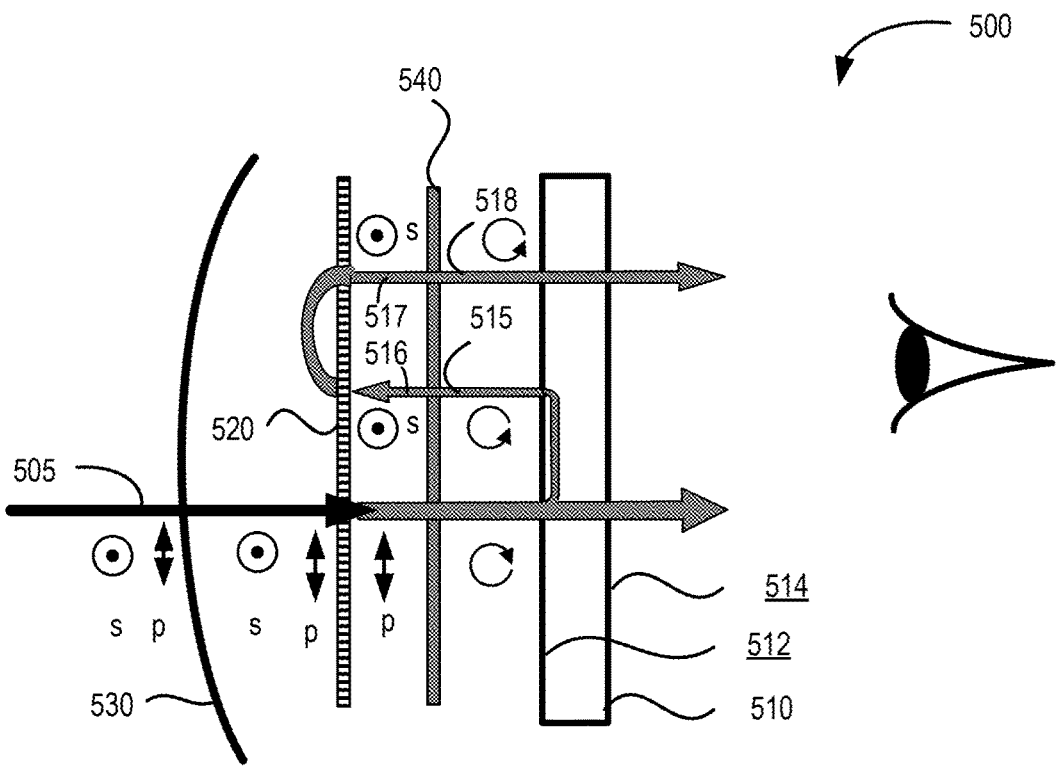
FIG. 5 is a side view illustrating a polarizer and a waveplate integrated with an eyepiece and a curved lens, according to some embodiments.

FIG. 5 is a side view illustrating a polarizer and a waveplate integrated with an eyepiece and a curved lens, according to some embodiments. FIG. 5 illustrates an eyepiece unit 500 including an eyepiece 510, a polarizer 520, a curved cosmetic lens 530, and a quarter waveplate 540. The eyepiece unit 500 projects images to a viewer's eyes. The eyepiece 510 has a world side 512 and a viewer side 514 opposite the world side 512. The eyepiece 510 can be AR coated on one or more surfaces, thereby reducing reflection and improving system performance. The curved cosmetic lens 530 is disposed adjacent the world side 512 of the eyepiece 510, the polarizer 520 disposed between the eyepiece 520 and the curved cosmetic lens 530, and the quarter waveplate 540 disposed between the eyepiece 510 and the polarizer 520.

World light represented by world light ray 505 including both p-polarized light and s-polarized light is incident on and passes through the curved cosmetic lens 530. The polarizer 520 is implemented in this embodiment as a dichroic polarizer such that s-polarized light is absorbed and p-polarized light is passed. The quarter waveplate 540 is oriented at an angle of 45° to the p-polarization and s-polarization axes such that p-polarized light passed by the polarizer 520 is rotated to produce circularly polarized light (e.g., left-handed circularly polarized light) that impinges on the eyepiece 510. Some reflection of the circularly polarized light can result as illustrated by reflected ray 515 (e.g., right-handed circularly polarized light). In an eyepiece unit without a polarizer (e.g., the polarizer 520) and a quarter waveplate (e.g., quarter waveplate 540), the reflected ray 515 can reach a cosmetic lens (e.g., the cosmetic lens 530) and be reflected back toward an eyepiece (e.g., the eyepiece 510). The reflected images can be magnified or reduced depending on the cosmetic lens 530. These distorted reflected images can result in word ghost images. In some embodiments, the polarizer 520 is a wire-grid polarizer. The reflected ray 515 can be converted by the quarter waveplate 540 to s-polarized light 516. The s-polarized light 516 can be reflected by wire-grid polarizer 520 and remains s-polarized light 517, which is converted by the quarter waveplate 540 to become circularly polarized light 518. Since the circularly polarized light 518 is parallel to the world light ray 505, it can improve brightness for the viewer. For example, the circularly polarized light 518 shows the same image/light as the world light ray 505. This may help increase the see-through brightness of the eyepiece 510 if the eyepiece 510 has Fresnel reflection. Further, world ghost images are not produced.

In some embodiments, in the reflected path, the reflected ray 515 can be converted to s-polarized light. The s-polarized light will be absorbed by the dichroic polarizer. If p-polarized light is present in the reflection path (for example, due to misalignment of the quarter waveplate 540 or because of emission from the eyepiece 510 from the world side 514 toward the curved cosmetic lens 530), it will be reflected by the polarizer 520, and can be converted to circularly polarized light by the quarter waveplate 540, and propagate toward the eyepiece 510. Since the circularly polarized light 518 is parallel to the world light ray 505, world ghost images are not produced and light in the p-polarization reflected from the eyepiece 510 is recycled, improving brightness for the viewer.

Figure 6:
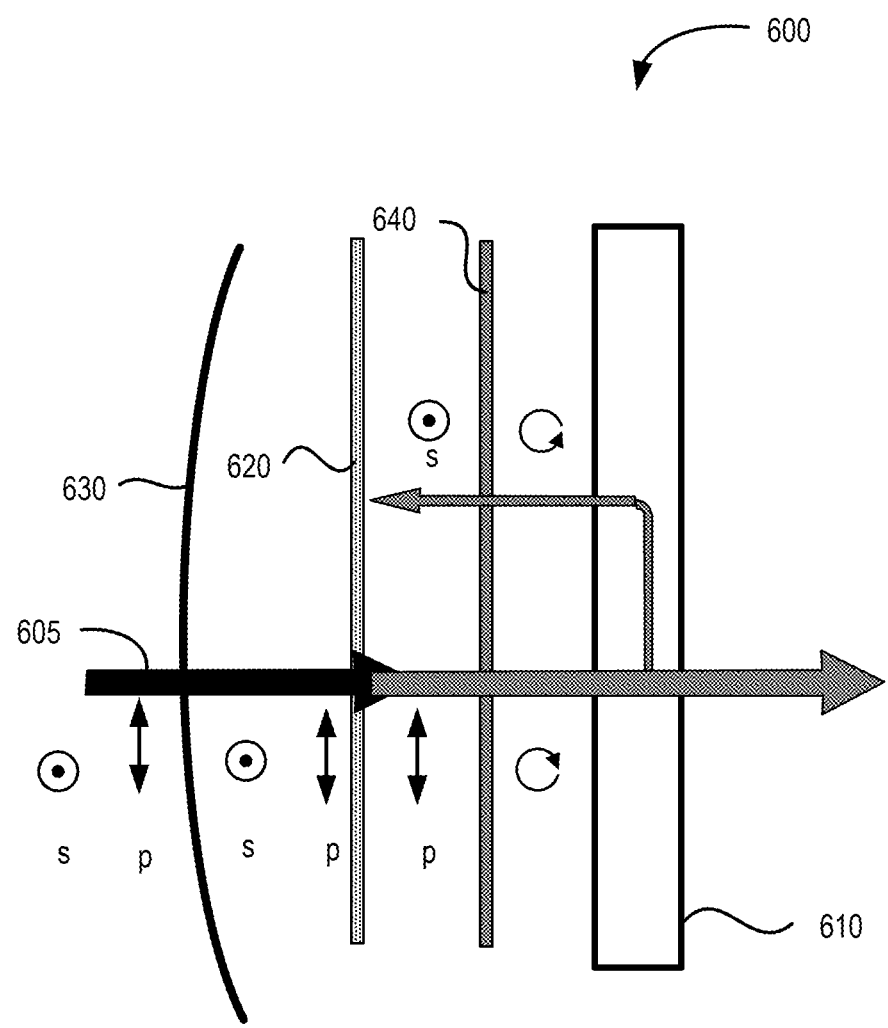
FIG. 6 is a side view illustrating an absorptive polarizer and a waveplate integrated with an eyepiece and a curved lens, according to some embodiments.

FIG. 6 is a side view illustrating an absorptive polarizer and a waveplate integrated with an eyepiece and a curved lens, according to some embodiments. The embodiment illustrated in FIG. 6 shares common elements with the embodiment illustrated in FIG. 5 and description provided in relation to FIG. 5 is applicable to FIG. 6 as appropriate. FIG. 6 illustrates an eyepiece unit 600 including an eyepiece 610, a dichroic polarizer 620, a curved cosmetic lens 630, and a quarter waveplate 640.

World light represented by world light ray 605 include both p-polarized and s-polarized light. The s-polarized light is absorbed by dichroic polarizer 620 and p-polarized light is converted to circularly polarized light by the quarter waveplate 640. Light reflected from the eyepiece 610 is converted into s-polarized light by the quarter waveplate 640 and is absorbed by the dichroic polarizer 620.

Figure 7:
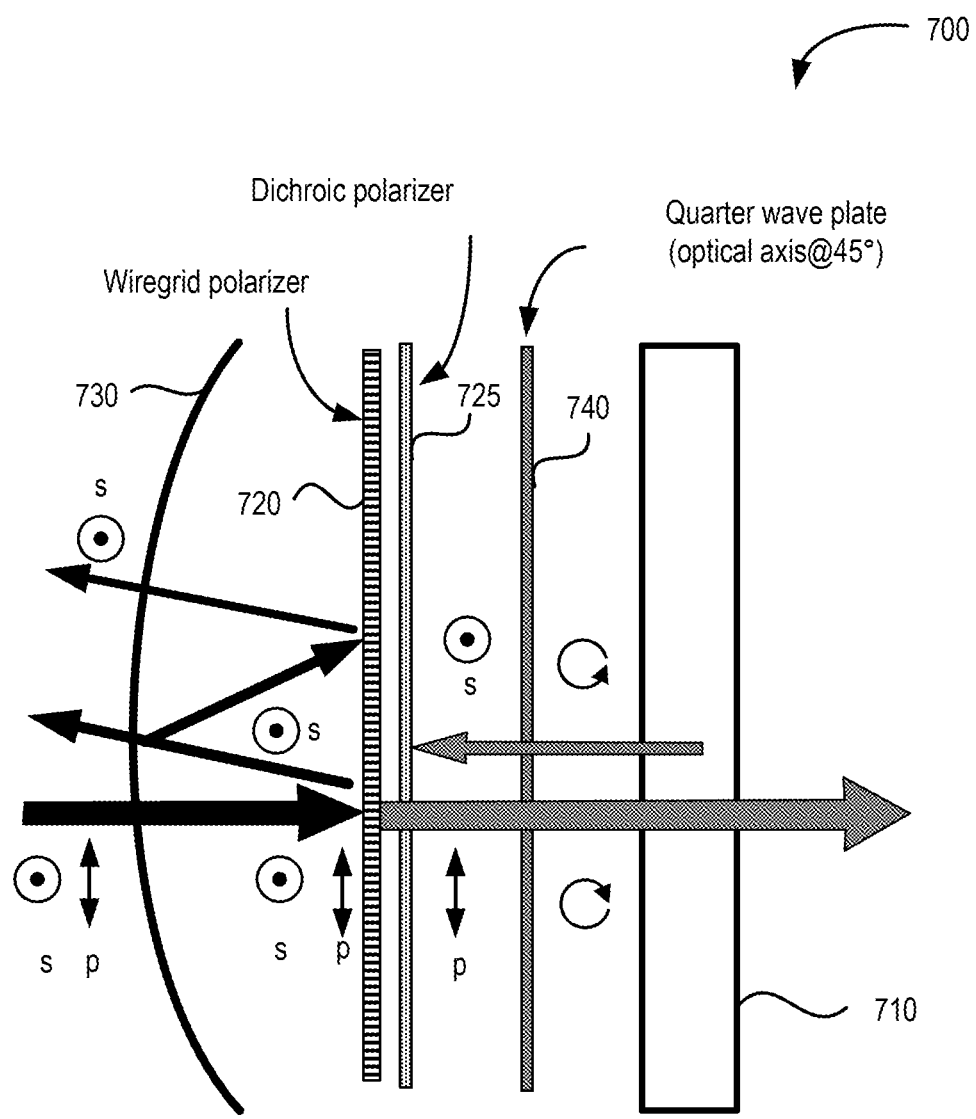
FIG. 7 is a side view illustrating a set of polarizers and a waveplate integrated with an eyepiece and a curved lens, according to some embodiments.

FIG. 7 is a side view illustrating a set of polarizers and a waveplate integrated with an eyepiece and a curved lens, according to some embodiments. The embodiment illustrated in FIG. 7 shares common elements with the embodiment illustrated in FIGS. 4 and 6 and description provided in relation to FIGS. 4 and 6 is applicable to FIG. 7 as appropriate. For example, the combination of a curved cosmetic lens and a wire grid polarizer are illustrated in FIG. 4 and the combination of a dichroic polarizer, a quarter waveplate, and an eyepiece are illustrated in FIG. 6. FIG. 7 illustrates an eyepiece unit 700 including an eyepiece 710, a wire grid polarizer 720, a dichroic polarizer 725, a curved cosmetic lens 730, and a quarter waveplate 740. The dichroic polarizer 725 is positioned between the wire grid polarizer 720 and the quarter waveplate 740.

World light includes both p-polarized and s-polarized light. The s-polarized light is reflected by the wire grid polarizer 720 toward the curved cosmetic lens 730. As discussed in relation to FIG. 4, the light in the s-polarization state that is reflected by the wire grid polarizer 720 would be normal to the plane of the eyepiece 710, but is illustrated as angled for purposes of clarity. After reflection off of the inside surface (i.e., right surface) of the curved cosmetic lens 730, some of the s-polarized light is be reflected back toward the wire grid polarizer 720 at a non-zero angle with respect to the normal since the curved cosmetic lens 730 is curved. As the s-polarized light undergoes multiple reflections between the wire grid polarizer 720 and the curved cosmetic lens 730, the amplitude of the s-polarized light will decrease.

The p-polarized light that passes through the wire grid polarizer 720 and the dichroic polarizer 725 will be converted to circularly polarized light by the quarter waveplate 740 and can pass through the eyepiece 710 to the viewer.

Light reflected from the eyepiece 710 will be converted to s-polarized light and will be absorbed by dichroic polarizer 725.

In implementations in which light projected through the eyepiece 710 is projected both toward the viewer as well as toward the world, the projection of light toward the world can decrease the image brightness for the viewer. Thus, embodiments of the present disclosure implement light recycling to increase the image brightness for the viewer. Additionally, since the light projected toward the world can potentially be viewed by others, embodiments of the present disclosure improve the privacy of the viewer by reducing the light projected toward the world.

Figure 8:
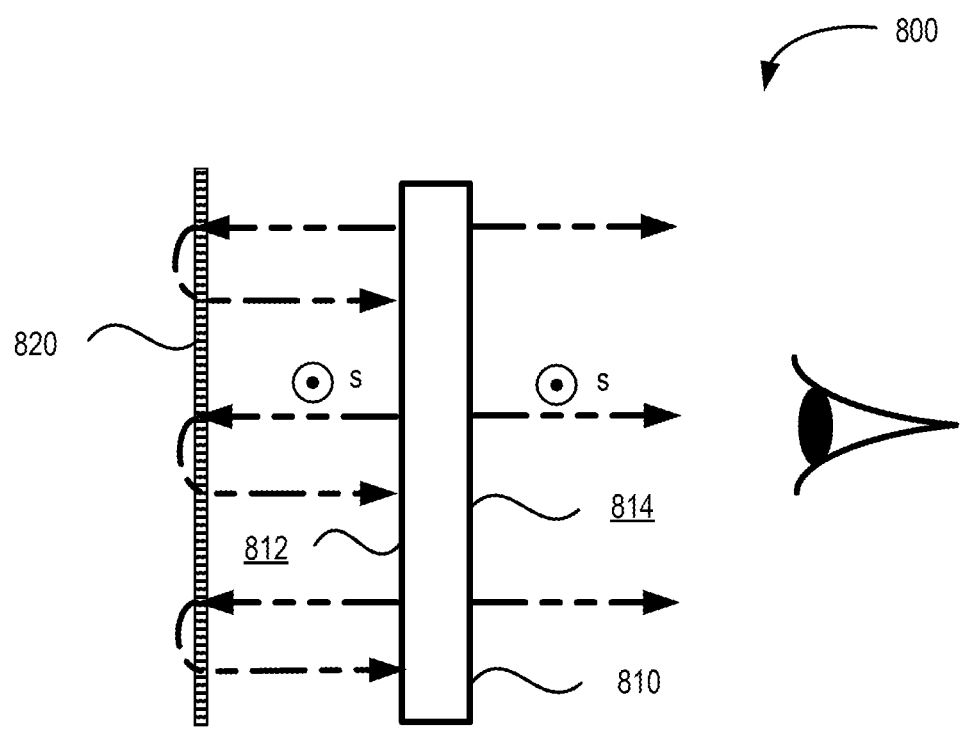
FIG. 8 is a side view illustrating a polarizer integrated with an eyepiece, according to some embodiments.

FIG. 8 is a side view illustrating a polarizer integrated with an eyepiece. according to some embodiments. The embodiment illustrated in FIG. 8 shares common elements with the embodiment illustrated in FIG. 2 and description provided in relation to FIG. 2 is applicable to FIG. 8 as appropriate. FIG. 8 illustrates an eyepiece unit 800 including an eyepiece 810 and a wire grid polarizer 820. The eyepiece 810 has a world side 812 and a user side 814 opposite the world side 812. Light emitted from the world side 812 of the eyepiece 810 toward the world in the s-polarization light, is reflected by wire grid polarizer 820 toward the eyepiece 810. Thus, light in the s-polarization that is emitted from the viewer side 814 is directed toward the viewer and light in the s-polarization that is emitted from the world side 814 is recycled by reflection from the wire grid polarizer 820 and directed toward the viewer. Accordingly, embodiments of the present disclosure increase the image brightness for the viewer through the implementation of light recycling.

Figure 9:
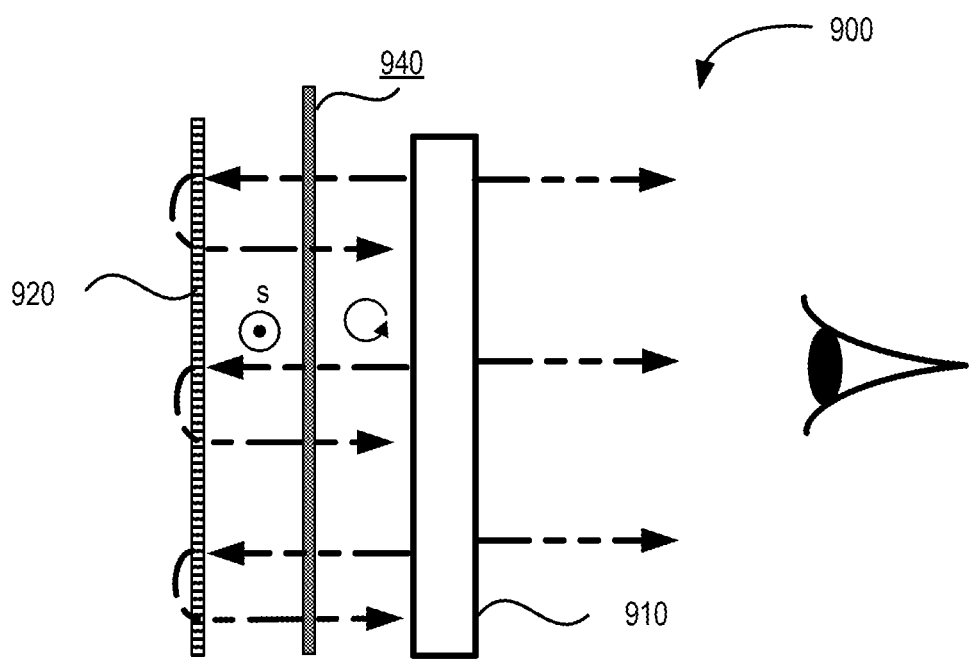
FIG. 9 is a side view illustrating a polarizer and a waveplate integrated with an eyepiece, according to some embodiments.

FIG. 9 is a side view illustrating a polarizer and a waveplate integrated with an eyepiece, according to some embodiments. The embodiment illustrated in FIG. 9 shares common elements with the embodiment illustrated in FIG. 8 and description provided in relation to FIG. 8 is applicable to FIG. 9 as appropriate. FIG. 9 illustrates an eyepiece unit 900 including an eyepiece 910, a wire grid polarizer 920, and a waveplate 940. The waveplate 940 is a waveplate to change a polarization state of light. In some embodiments, the waveplate 940 is a quarter waveplate. In cases in which the light emitted by the eyepiece 910 is circularly or elliptically polarized, the polarization state of the emitted light can be controlled to provide light that is aligned with the reflection axis of the wire grid polarizer 920. In the illustrated embodiment, circularly polarized light emitted from the eyepiece 910 is converted to s-polarized light by the quarter waveplate 940, reflected by the wire grid polarizer 920, and recycled for transmission to the viewer.

It should be noted that in addition to recycling of world light, light emitted by the eyepiece 910 can be recycled as illustrated in FIGS. 8 and 9. In these embodiments, viewer privacy may be enhanced since less light emitted by the eyepiece 810/910 is available for viewing by those observing the eyepiece unit 800/900 from the world side.

Figure 10:
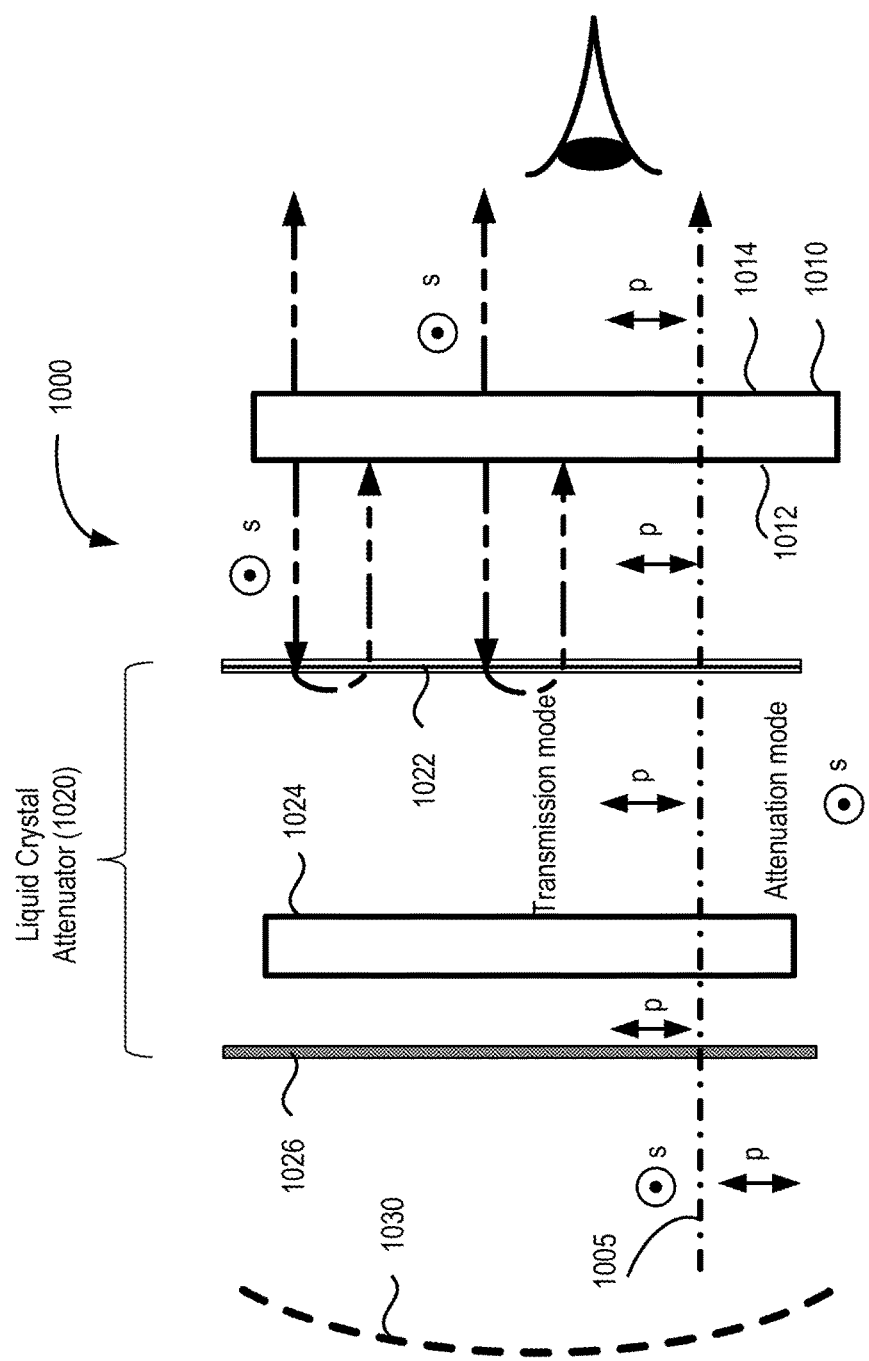
FIG. 10 is side view illustrating a set of polarizers and a liquid crystal element integrated with an eyepiece, according to some embodiments.

FIG. 10 is side view illustrating a set of polarizers and a liquid crystal element integrated with an eyepiece, according to some embodiments. A liquid crystal element, also referred to as a liquid crystal cell, operates as an element of a liquid crystal attenuator and enables dynamic attenuator functionality, which may be useful depending on the brightness of the viewer's surroundings. If the liquid crystal cell is pixelated, it can also perform localized occlusion. For example, when the viewer is indoors, the amount of ambient light can be low and attenuation by an eyepiece unit may be negligible or reduced to zero. However, when the viewer moves outdoors, for example on a sunny day, the ambient light level can increase markedly and the eyepiece unit may benefit from the ability to dynamically attenuate the world light so that the light emitted by the eyepiece will not be negligible in comparison to the world light.

FIG. 10 illustrates an eyepiece unit 1000 including an eyepiece 1010, a liquid crystal attenuator 1020, and an optional curved cosmetic lens 1030. The eyepiece 1010 has a world side 1012 and a viewer side 1014 adjacent the world side 1012. The liquid crystal attenuator 1020 is disposed adjacent the world side 1012 of the eyepiece 1010 between the curved cosmetic lens 1030 and the eyepiece 1010. The liquid crystal attenuator 1020 includes polarizers adjacent both surfaces of a liquid crystal element 1024. A wire grid polarizer 1022 is adjacent the world side 1012 of the eyepiece 1010, the liquid crystal element 1024 is adjacent the wire grid polarizer 1022, and a dichroic polarizer 1026 is adjacent the liquid crystal element 1024. Although the wire grid polarizer 1022 and the dichroic polarizer 1026 are illustrated as spatially separated from the liquid crystal element 1024, it should be understood that typically, these polarizers 1022/1026 may be in contact with the surfaces of the liquid crystal element 1024. For example, the wire grid polarizer 1022 can be laminated to the liquid crystal element 1024. Additionally, although a spatial separation is illustrated between the wire grid polarizer 1022 and the eyepiece 1010, this is not required and these elements can be in physical contact. For example, the wire grid polarizer 1022 can be laminated to the eyepiece 1010. One of ordinary skill in the art would recognize many variations, modifications, and alternatives.

The eyepiece unit 1000 performs both dynamic attenuation of world light as well as recycling of light emitted from the eyepiece 1010, thereby increasing image brightness. World light ray 1005 incident from the world includes both p-polarized and s-polarized light. The dichroic polarizer 1026 absorbs the s-polarized light and passes the p-polarized light. In the transmission mode, the liquid crystal element 1024 does not change the polarization state of the light and the p-polarized light passes through the eyepiece 1010 to the viewer. In the attenuation mode, the liquid crystal element 1024 is used to rotate the polarization of the light to the s-polarization, which is reflected by the wire grid polarizer 1022. Thus, through control of the polarization rotation imparted by the liquid crystal element 1024, a dynamic attenuation functionality is achieved. In the embodiment illustrated in FIG. 10, wire grid polarizer 1022 is operable to pass p-polarized light and reflect s-polarized light and dichroic polarizer 1026 is operable to transmit p-polarized light, but this is not required by the present disclosure. In other embodiments, the polarization states can be switched as appropriate to the particular application. One of ordinary skill in the art would recognize many variations, modifications, and alternatives.

In addition to dynamic attenuation, light emitted from the eyepiece 1010 is recycles. Referring once again to FIG. 10, light emitted from the world side 1012 of the eyepiece 1010 in the s-polarization is reflected by wire grid polarizer 1022 toward the eyepiece 1010, where it propagates toward the viewer along with light emitted from the viewer side 1014 of the eyepiece 1010 in the s-polarization. The curved cosmetic lens 1030 disposed adjacent the dichroic polarizer 1026 can be optionally added in some embodiments.

According to some aspects of the present disclosure, an eyepiece unit for projecting an image to an eye of a viewer is provided. The eyepiece unit includes an eyepiece having a world side and a viewer side opposite the world side and a polarizer disposed adjacent the world side of the eyepiece.

The polarizer can include a wire grid polarizer, for example, that is operable to transmit p-polarized light and reflect s-polarized light. The eyepiece unit can also include a liquid crystal element adjacent the wire grid polarizer and a dichroic polarizer adjacent the liquid crystal element. The polarizer can include an absorptive polarizer. In one embodiment, the eyepiece is characterized by a polarization sensitivity for light at angles of incidence greater than 37 degrees. For example, the polarization sensitivity can be characterized by a ratio of a coupling efficiency for s-polarized light to a coupling efficiency for p-polarized light of greater than one. The ratio can be greater than 3:1 or greater than 20:1. The eyepiece can include an input coupling diffractive optical element, an orthogonal pupil expander diffractive optical element, and an exit pupil expander diffractive optical element and the polarization sensitivity is associated with the exit pupil expander.

According to some aspects of the present disclosure, the input coupling diffractive optical element includes a grating, the orthogonal pupil expander diffractive optical element includes a grating, and the exit pupil expander diffractive optical element includes a grating. The eyepiece unit can further include a waveplate disposed between the eyepiece and the polarizer. For instance, the waveplate includes a quarter waveplate at a visible wavelength at angles of incidence greater than 37 degrees. Moreover, the eyepiece unit can additionally include a cosmetic lens, wherein the polarizer is disposed between the cosmetic lens and the eyepiece. The cosmetic lens may include a curved cosmetic lens. In a particular example, the eyepiece, the curved cosmetic lens, and the polarizer are positioned along an optical axis. The polarizer can include a wire grid polarizer and the wire grid of the wire grid polarizer can be oriented orthogonal to the optical axis.

In some aspects, the eyepiece unit includes a liquid crystal element disposed between the polarizer and the curved cosmetic lens and a dichroic polarizer disposed between the liquid crystal element and the curved cosmetic lens. The wire grid polarizer and the dichroic polarizer can be operable to transmit p-polarized light.

In some aspects of the present disclosure, an eyepiece unit for projecting an image to an eye of a viewer is provided. The eyepiece unit includes an eyepiece having a world side and a viewer side opposite the world side, a curved cosmetic lens disposed adjacent the world side of the eyepiece, a polarizer disposed between the eyepiece and the curved cosmetic lens, and a quarter waveplate disposed between the eyepiece and the polarizer. The polarizer can include a wire grid polarizer. The eyepiece unit can also include a dichroic polarizer positioned between wire grid polarizer and the quarter waveplate. As an example, the polarizer can include a dichroic polarizer.

In some aspects of the present disclosure, an eyepiece unit for projecting an image to an eye of a viewer is provided. The eyepiece unit includes an eyepiece having a world side and a viewer side opposite the world side and a liquid crystal attenuator disposed adjacent the world side of the eyepiece. The liquid crystal attenuator includes a wire grid polarizer adjacent the world side of the eyepiece, a liquid crystal element adjacent the wire grid polarizer, and a dichroic polarizer adjacent the liquid crystal element. In an example, the eyepiece unit also includes a curved cosmetic lens disposed adjacent the dichroic polarizer. For instance, the curved cosmetic lens can be characterized by an optical power. The wire grid polarizer can be laminated to the eyepiece, for example, laminated to the liquid crystal element. The wire grid polarizer can be operable to pass p-polarized light and reflect s-polarized light.

It is also understood that the examples and embodiments described herein are for illustrative purposes only and that various modifications or changes in light thereof will be suggested to persons skilled in the art and are to be included within the spirit and purview of this application and scope of the appended claims.

Upon reading this disclosure, those of skill in the art will appreciate still additional alternative structural and functional designs for a system and a process for motion-based content navigation through the disclosed principles herein. Thus, while particular embodiments and applications have been illustrated and described, it is to be understood that the disclosed embodiments are not limited to a precise construction and components disclosed herein. Various modification, changes and variations, which will be apparent to those skilled in the art, can be made in the arrangement, operation and details of the method and apparatus disclosed herein without departing from the spirit and scope defined in the appended claims.

What is claimed is:

1. An eyepiece unit for projecting an image to an eye of a viewer, the eyepiece unit comprising:
    an eyepiece having a world side and a viewer side opposite the world side, wherein the eyepiece comprises:
        an input coupling diffractive optical element,
        an orthogonal pupil expander diffractive optical element, and
        an exit pupil expander diffractive optical element;
    a curved cosmetic lens disposed adjacent the world side of the eyepiece;
    a polarizer disposed between the eyepiece and the curved cosmetic lens; and
    a quarter waveplate disposed between the eyepiece and the polarizer.

2. The eyepiece unit of claim 1, wherein the polarizer comprises a wire grid polarizer.

3. The eyepiece unit of claim 2, further comprising a dichroic polarizer positioned between wire grid polarizer and the quarter waveplate.

4. The eyepiece unit of claim 1, wherein the polarizer comprises a dichroic polarizer.

5. The eyepiece unit of claim 1 wherein the polarizer comprises a wire grid polarizer, the eyepiece unit further comprising:
    a liquid crystal element, wherein the wire grid polarizer is disposed between the liquid crystal element and the eyepiece; and
    a dichroic polarizer, wherein the liquid crystal element is disposed between the wire grid polarizer and the dichroic polarizer.

6. The eyepiece unit of claim 1, wherein the eyepiece is characterized by a polarization sensitivity characterized by a ratio of a coupling efficiency for light having a first polarization to a coupling efficiency for light having a second polarization of greater than one.

7. The eyepiece unit of claim 6, wherein the ratio is greater than 3:1.

8. The eyepiece unit of claim 7, wherein the ratio is greater than 20:1.

9. The eyepiece unit of claim 1, wherein the input coupling diffractive optical element comprises a grating, the orthogonal pupil expander diffractive optical element comprises a grating, and the exit pupil expander diffractive optical element comprises a grating.

10. The eyepiece unit of claim 1, wherein the polarizer comprises an absorptive polarizer.

11. The eyepiece unit of claim 1, further comprising a waveplate disposed between the eyepiece and the polarizer.

12. The eyepiece unit of claim 1, further comprising a curved cosmetic lens, wherein the polarizer is disposed between the curved cosmetic lens and the eyepiece.

13. The eyepiece unit of claim 12, wherein the eyepiece, the curved cosmetic lens, and the polarizer are positioned along an optical axis, wherein the polarizer comprises a wire grid polarizer, and wherein the wire grid of the wire grid polarizer is oriented orthogonal to the optical axis.

14. An eyepiece unit for projecting an image to an eye of a viewer, the eyepiece unit comprising:
   an eyepiece having a world side and a viewer side opposite the world side, wherein the eyepiece comprises:
      an input coupling diffractive optical element,
      an orthogonal pupil expander diffractive optical element, and
      an exit pupil expander diffractive optical element; and
   a liquid crystal attenuator disposed adjacent the world side of the eyepiece, wherein the liquid crystal attenuator comprises:
      a wire grid polarizer adjacent the world side of the eyepiece;
      a liquid crystal element, wherein the wire grid polarizer is disposed between the liquid crystal element and the eyepiece; and
      a dichroic polarizer, wherein the liquid crystal element is disposed between the wire grid polarizer and the dichroic polarizer.

15. The eyepiece unit of claim 14, further comprising a curved cosmetic lens, wherein the dichroic polarizer is disposed between the liquid crystal element and the curved cosmetic lens.

16. The eyepiece unit of claim 15, wherein the curved cosmetic lens is characterized by an optical power.

17. The eyepiece unit of claim 15, wherein the eyepiece, the curved cosmetic lens, and the wire grid polarizer are positioned along an optical axis and wherein the wire grid of the wire grid polarizer is oriented orthogonal to the optical axis.

18. The eyepiece unit of claim 14, wherein the wire grid polarizer is laminated to the eyepiece.

19. The eyepiece unit of claim 14, wherein the wire grid polarizer is laminated to the liquid crystal element.

20. The eyepiece unit of claim 14, wherein the wire grid polarizer is operable to transmit light having a first polarization and reflect light having a second polarization orthogonal to the first polarization.

21. The eyepiece unit of claim 20, wherein the eyepiece is characterized by a polarization sensitivity characterized by a ratio of a coupling efficiency for light having the second polarization to a coupling efficiency for light having the first polarization of greater than one.

22. The eyepiece unit of claim 21, wherein the ratio is greater than 3:1.

23. The eyepiece unit of claim 22, wherein the ratio is greater than 20:1.

24. The eyepiece unit of claim 14, wherein the input coupling diffractive optical element comprises a grating, the orthogonal pupil expander diffractive optical element comprises a grating, and the exit pupil expander diffractive optical element comprises a grating.

* * * * *